US011846386B2

(12) United States Patent
Cheng (10) Patent No.: US 11,846,386 B2
(45) Date of Patent: Dec. 19, 2023

(54) MOUNTING JIG AND MOUNTING METHOD (71) Applicants: HKC CORPORATION LIMITED, Shenzhen (CN); CHONGQING HKC OPTOELECTRONICS TECHNOLOGY CO., LTD., Chongqing (CN)

(72) Inventor: Jiahe Cheng, Chongqing (CN)

(73) Assignees: HKC CORPORATION LIMITED, Shenzhen (CN); CHONGQING HKC OPTOELECTRONICS TECHNOLOGY CO., LTD, Chongqing (CN)

( * ) Notice: Subject to any disclaimer, the term of this patent is extended or adjusted under 35 U.S.C. 154(b) by 653 days.

(21) Appl. No.: 17/040,038

(22) PCT Filed: Nov. 16, 2018

(86) PCT No.: PCT/CN2018/115828
§ 371 (c)(1),
(2) Date: Sep. 21, 2020

(87) PCT Pub. No.: WO2020/082464
PCT Pub. Date: Apr. 30, 2020

(65) Prior Publication Data
US 2021/0018140 A1    Jan. 21, 2021

(30) Foreign Application Priority Data
Oct. 22, 2018    (CN) .......................... 201811230460.8

(51) Int. Cl.
*F16M 13/02*    (2006.01)

(52) U.S. Cl.
CPC .................................. *F16M 13/02* (2013.01)

(58) Field of Classification Search
CPC .............................. F16M 13/02; F16M 11/041
See application file for complete search history.

(56) References Cited

U.S. PATENT DOCUMENTS

2003/0201372 A1* 10/2003 Dozier .................. F16M 11/10
248/495

FOREIGN PATENT DOCUMENTS

| CN | 1514927   | A | * | 7/2004  | ............... G01B 3/02 |
| CN | 1514927   | A |   | 7/2004  |                          |
| CN | 103088848 | A |   | 5/2013  |                          |
| CN | 104295873 | A |   | 1/2015  |                          |
| CN | 204913427 | U |   | 12/2015 |                          |
| CN | 105783268 | A |   | 7/2016  |                          |
| CN | 205625754 | U | * | 10/2016 |                          |

(Continued)

OTHER PUBLICATIONS

CN-205625754-U English translation (Year: 2016).*

(Continued)

*Primary Examiner* — Jason L Vaughan
*Assistant Examiner* — Amanda Kreiling (57) ABSTRACT

The present disclosure provides a mounting jig and a mounting method. The mounting jig is configured to mount a wall-hanging piece on a wall. At least two grooves configured to fix the wall-hanging piece are disposed on the wall hanging piece. The mounting jig includes at least two positioning structures. A spacing between the positioning structures is equal to a spacing between the grooves corresponding to the positioning structures.

15 Claims, 4 Drawing Sheets

(56) References Cited

FOREIGN PATENT DOCUMENTS

| | | |
|---|---|---|
| CN | 205625754 U | 10/2016 |
| EP | 2478811 A1 | 7/2012 |
| ES | 1150110 U | 2/2016 |

OTHER PUBLICATIONS

CN-1514927-A English translation (Year: 2004).*
Guan Wang, the ISA written comments, Jul. 2019, CN.
Guan Wang, the International Search Report, dated Jul. 2019, CN.

* cited by examiner

MOUNTING JIG AND MOUNTING METHOD

The present application claims foreign priority to Chinese Patent Application No. CN201811230460.8, titled: MOUNTING JIG AND MOUNTING METHOD, filed on Oct. 22, 2018 in the State Intellectual Property Office of China, and the entire contents of which is hereby incorporated by reference.

TECHNICAL FIELD

The present disclosure relates to a field of display technology, and in particular to a mounting jig and a mounting method.

BACKGROUND

The statements herein only provides background information related to the present disclosure without necessarily constituting the prior art.

With the development and advancement of technology, flat panel displays have become mainstream products of displays because of their thin bodies, low power consumption and low radiation, and have been widely used. The flat panel displays include thin film transistor-liquid crystal display (TFT-LCD), organic light-emitting diode (OLED) displays, and etc.

In order to utilize indoor space, a flat-panel television (FPTV) is hung and mounted on a surface of a wall. A plurality of screws are locked on the wall, and the flat-panel TV is hung on screws columns of the screws to fix on the wall. When the screws, are locked to the wall manually. a deviation of a distance between each of the two screws is easily generated, which is unable to accurately engaged with slots on the flat-panel TV backboard.

SUMMARY

An object of the present disclosure is to provide a mounting jig and a mounting method accurate positioning of mount a wall-hanging piece.

To achieve the above object, the present disclosure provides a mounting jig. The mounting jig configured to mount a wall-hanging piece on a wall. At least two grooves configured to fix the wall-hanging piece are disposed on the wall hanging piece. The mounting jig comprises at least two positioning structures. A spacing between the positioning structures is equal to a spacing between the grooves corresponding to the positioning structures.

Optionally, the mounting jig comprises a first substrate and a second substrate. A thickness of the first substrate is equal to a depth of the grooves of the wall-hanging piece.

Optionally, the positioning structures are disposed on the first substrate.

Optionally, a thickness of the second substrate is greater than a thickness of the first substrate.

Optionally, the positioning structures comprise hole slots. The hole slots are semicircular. The hole slots are disposed on an edge of the first substrate. A radial size of the hole slots is equal to a radial size of the fixing pieces configured to hang the wall-hanging piece.

Optionally, an inner side surface of the second substrate is flush with an inner side surface of the first substrate. An outer side surface of the second substrate is connected with an outer side surface of the first substrate via a slope.

Optionally, a surface of the slope is rough.

Optionally, a level gauge is disposed inside the second, substrate.

Optionally, the wall-hanging piece comprises a display device. The grooves are disposed at a top portion of the display device.

Optionally, a horizontal length of the mounting jig is greater than a length of the wall-hanging piece.

The present disclosure further provides a mounting jig. The mounting jig is configured to mount a display device on a wall. At least two grooves configured to fix the display device are disposed on the display device. The mounting, jig comprises at least two hole slots. A spacing between the hole slots is equal to a spacing between the grooves corresponding to the hole slots. The mounting jig comprises a first substrate and a second substrate. A thickness of the first substrate is equal to a depth of the grooves of the wall-hanging piece. A thickness of the second substrate is greater than a thickness of the first substrate. The hole slots are semicircular. The hole slot are disposed on an edge of the first substrate. A radial size of the hole slots is equal to a radial size of screws configured to hang the display device. An inner side surface of the second substrate is flush with an inner side surface of the first substrate. An outer side surface of the second substrate is connected with an outer side surface of the first substrate via a slope.

The present disclosure further provides a mounting method comprises:

placing a mounting jig on an appropriate position of a wall;
manufacturing mounting holes on the wall, by positioning structures of the mounting jig;
locking fixing pieces matched with a wall-hanging piece into the mounting holes, and removing the mounting jig; and
matching the grooves of the wall-hanging piece with the fixing pieces, and mounting the wall-hanging piece to the wall.

Optionally, the mounting jig comprises at least two positioning structures. At least two grooves configured to fix the wall-hanging piece are disposed on the wall hanging piece. A spacing between the positioning structures is equal to a spacing between the grooves corresponding to the positioning structures.

Optionally, the mounting jig comprises a first substrate and a second substrate. A thickness of the first substrate is equal to a depth of the grooves of the wall-hanging piece.

Optionally, the step for locking fixing pieces matched with a wall-hanging piece into the mounting holes, and removing the mounting jig comprises: the fixing pieces comprise screws. The positioning structures comprise hole slots. The hole slots are semicircular. The hole slots are disposed on an edge of the first substrate. The screws are locked into the mounting holes to vertically remove the mounting jig.

Optionally, the step for placing a mounting jig on an appropriate position of a wall comprises: the mounting jig comprises a level gauge and the level gauge is configured to horizontally place the mounting jig on the wall.

Optionally, the wall-hanging piece comprises a display device. The grooves are disposed at a top portion of the display device.

Optionally, the display device is attached with a surface of the wall after mounting on the wall.

Compared to locking the screw to the wall manually, the present disclosure use the mounting jig to assist the locking of the screws. There is one-to-one correspondence between the positioning structures disposed on the mounting jig and the grooves disposed on the wall hanging piece, ensuring that spacing between the screws accurately position and lock the screws, and ensuring that the screws locked to the wall are aligned, assembled and fixed with the grooves of the wall-hanging piece accurately.

BRIEF DESCRIPTION OF DRAWINGS

The drawings are included to provide a further understanding of embodiments of the present disclosure, which form portions of the specification and are used to illustrate implementation manners of the present disclosure and are intended to illustrate operating principles of the present disclosure together with the description. Apparently, the drawings in the following description are merely some of the embodiments of the present disclosure, and those skilled in the art are able to obtain other drawings according to the drawings without contributing any inventive labor. In the drawing.

DETAILED DESCRIPTION

Specific structure and function details disclosed herein are only representative and are used for the purpose of describing exemplary embodiments of the present disclosure. However, the present disclosure may be achieved in many alternative forms and shall not be interpreted to be only limited to the embodiments described herein.

It should be understood in the description of the present disclosure that terms such as "central", "horizontal", "upper", "lower", "left", "right", "vertical", "horizontal", "top", "bottom", "inner", "outer", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure. In addition, the terms such as "first" and "second" are only used for the purpose of description, rather than being understood to indicate or imply relative importance or hint the number of indicated technical features. Thus, the feature limited by "first" and "second" can explicitly or impliedly comprise one or more features. In the description of the present disclosure, the meaning of "a plurality of" is two or more unless otherwise specified. In addition, the term "comprise" and any variant are intended to cover non-exclusive inclusion.

It should be noted in the description of the present disclosure that, unless otherwise regulated and defined, terms such as "installation," "bonded," and "bonding" shall be understood in broad sense, and for example, may refer to fixed bonding or detachable bonding or integral bonding; may refer to mechanical bonding or electrical bonding; and may refer to direct bonding or indirect bonding through an intermediate medium or inner communication of two elements. For those of ordinary skill in the art, the meanings of the above terms in the present disclosure may be understood according to concrete conditions.

The terms used herein are intended to merely describe concrete embodiments, not to limit the exemplary embodiments. Unless otherwise noted clearly in the context, singular forms "one" and "single" used herein are also intended to comprise plurals. It should also be understood that the terms "comprise" and/or "include" used herein specify the existence of stated features, integers, steps, operation, units and/or assemblies, not excluding the existence or addition of one or more other features, integers, steps, operation, units, assemblies and/or combinations of these.

The present disclosure is described below in conjunction with the drawings and optional embodiments.

As shown in FIG. 1 to FIG. 6, the present disclosure provides a mounting jig 100. The mounting jig 100 is configured to mount a wall-hanging piece on a wall. At least two grooves 210 configured to fix the wall-hanging piece are disposed on the wall hanging piece. The mounting jig 100 comprises at least two positioning structures 110. A spacing between the positioning structures 110 is equal to a spacing between the grooves 210 corresponding to the positioning structures 110.

In this embodiment, there is one-to-one correspondence between the positioning structures 110 disposed on the mounting jig 100 and the grooves 210 disposed on the wall hanging piece, ensuring that the screws locked to the wall are aligned mounted and fixed with the grooves of the wall-hanging piece accurately. The mounting jig 100 is configured to assist wall-hanging fixing pieces to be mounted in a straight line, ensuring that the wall-hanging piece is mounted aligned, assembled and fixed with the wall-hanging fixing pieces accurately.

Figure 1:
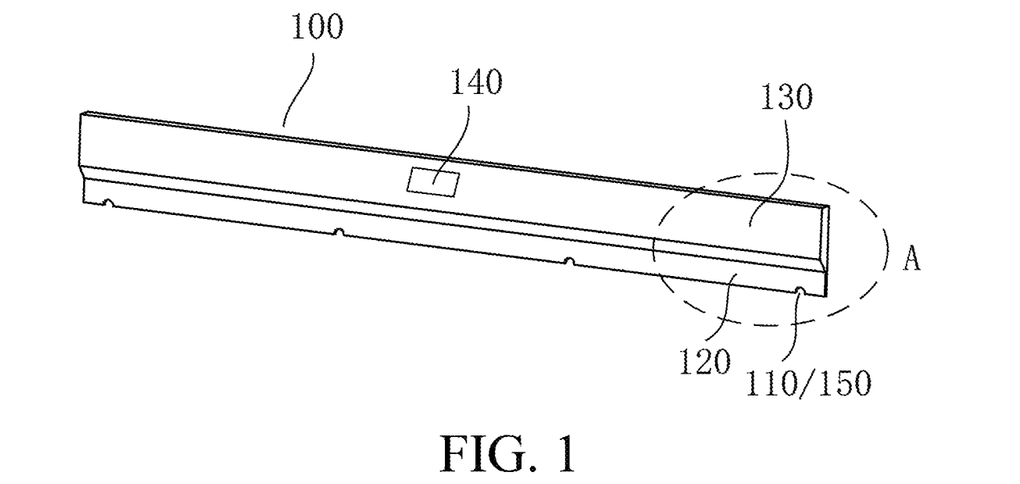
FIG. 1 is a schematic diagram of a mounting jig according to an embodiment of the present disclosure.
Figure 2:
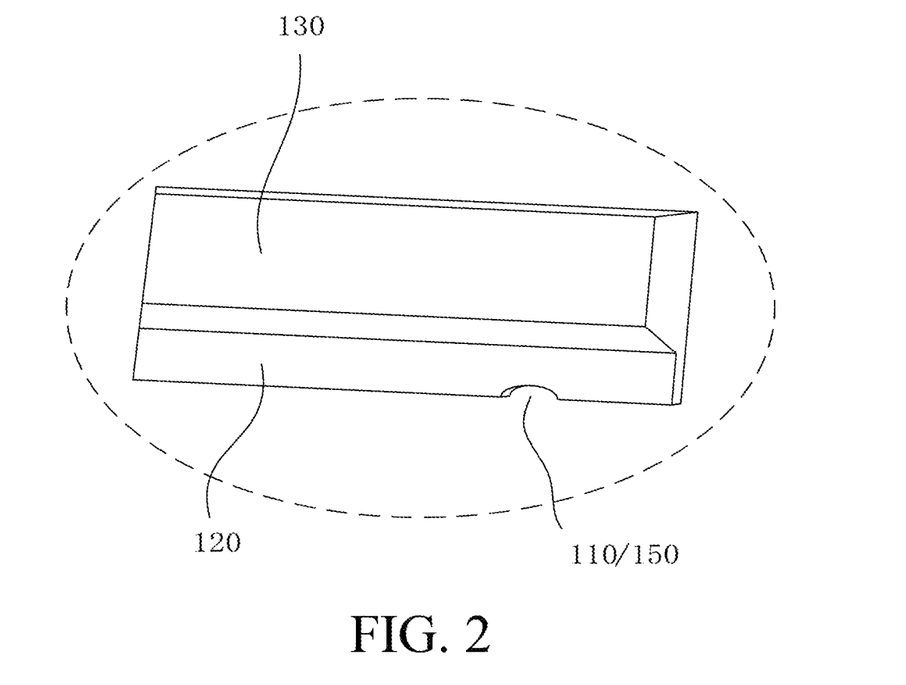
FIG. 2 is a schematic diagram of an enlarged view of portion A of the mounting jig according to an embodiment of the present disclosure.
Figure 3:
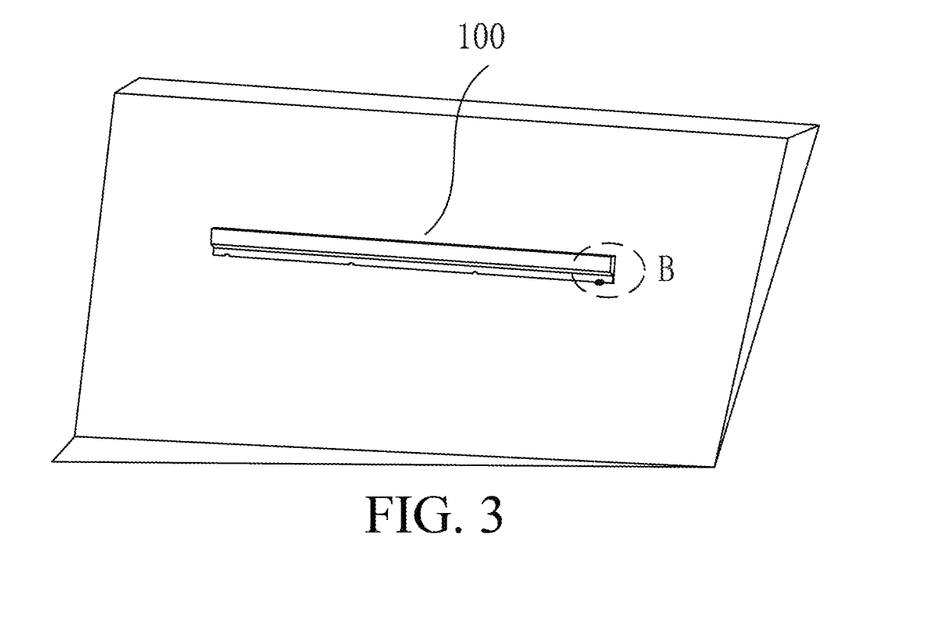
FIG. 3 is a schematic diagram of the mounting jig assisting a mounting of screws according to an embodiment of the present disclosure.

In an embodiment, the mounting jig 100 comprises a first substrate 120 and a second substrate 130. A thickness of the first substrate 120 is equal to a depth of the grooves 210 of the wall-hanging piece.

In this embodiment, the fixing pieces are fixed on the wall, and the wall-hanging piece is hung on the fixing pieces, thus, the fixing pieces are not completely aligned with the wall. According to a depth that the fixing pieces need to stick into the grooves of the wall-hanging piece, the thickness of the first substrate 120 is equal to the depth of the grooves 210, ensuring that the reserved exposed size of the fixing pieces is equal to the depth required to be stuck into the grooves 210 of the wall-hanging piece, thus, the wall-hanging piece is attached to the wall.

In an embodiment, the positioning structures 110 are disposed on the first substrate 120.

In this embodiment, the thickness of the first substrate 120 is equal to a reserved exposed size of the fixing pieces, thus, the positioning structures 110 are disposed on the first substrate 120 to facilitate an operation.

In an embodiment, a thickness of the second substrate 130 is greater than a thickness of the first substrate 120.

In this embodiment, the thickness of the first substrate 120 is equal to the reserved exposed size of the fixing pieces, thus, the first substrate 120 is relatively thin. The thickness of the second substrate 130 is greater than the thickness of the first substrate 120, which improves a mechanical strength of the mounting jig 100, and makes the mounting jig 100 being not easily deformed.

In an embodiment, the positioning structures 110 comprise hole slots 150. The hole slots 150 are semicircular. The hole slots 150 are disposed on an edge of the first substrate 120. The fixing pieces comprise screws. A radial size of the hole slots 150 is equal to a radial size of the screws configured to hang the wall-hanging piece.

Figure 4:
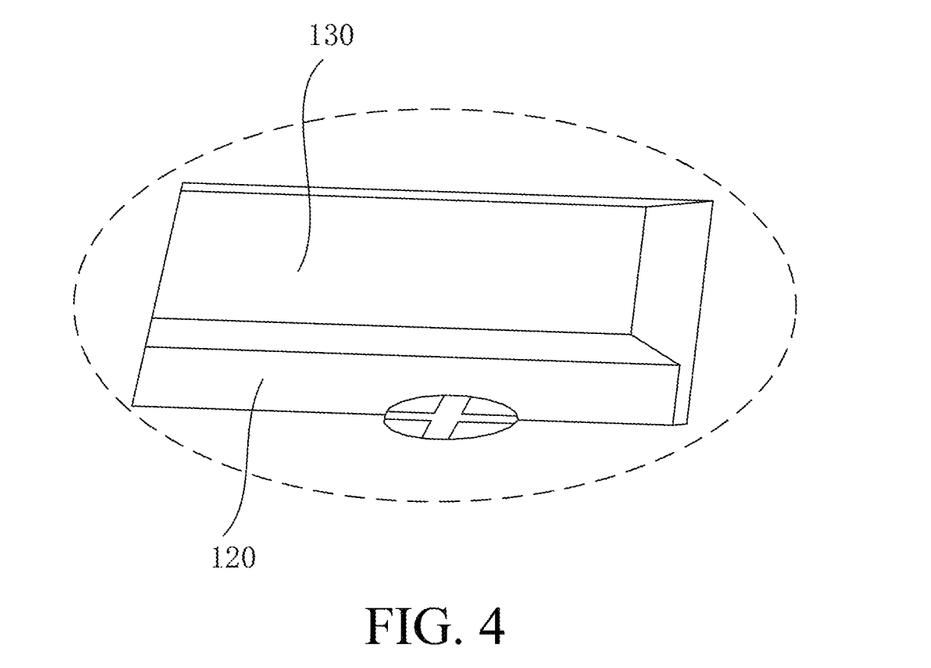
FIG. 4 is a schematic diagram of an enlarged view of portion B of the mounting jig assisting the mounting of screws according to an embodiment of the present disclosure.

In this embodiment, a diameter of a screw head of the screws is greater than a diameter of a screw column of the screws. When the screws are screwed into the hole slots 150, the hole slots 150 are semicircular and the hole slots 150 are disposed on an edge of the first substrate 120, which facilitate a separation of the mounting jig and the screws. A diameter of the hole slots 150 of the mounting jig 100 is equal to a diameter of the screws configured to hang the wall-hanging piece, thus, the screws is positioned within the hole slots 150 in the mounting jig 100 and the accuracy of a mounting of the screws is increased.

In an embodiment, an inner side surface of the second substrate 130 is flush with an inner side surface of the first substrate 120. An outer side surface of the second substrate 130 is connected with an outer side surface of the first substrate 120 via a slope.

In this embodiment, the thickness of the first substrate 120 is different with the thickness of the second substrate 130, and there is a height difference between the first substrate 120 and the second substrate 130. A strength of a connection portion of the first substrate 120 and the second substrate 130 is improved by the slope. Moreover, the slope is convenient for thumbs to press and support the mounting jig 100 during the mounting process.

In an embodiment, a surface of the slope is rough.

In this embodiment, the slope facilitate the press and support of the thumbs. The surface of the slope is rough, which increases a friction between the thumbs and the slope, and makes grip of thumbs more stable.

In an embodiment, a level gauge 140 is disposed inside the second substrate 130.

In this embodiment, the level gauge 140 disposed inside the second substrate 130 ensures that the screws are on a same horizontal line during mounting process, and keeps the mounting of the wall-hanging piece level.

Figure 5:
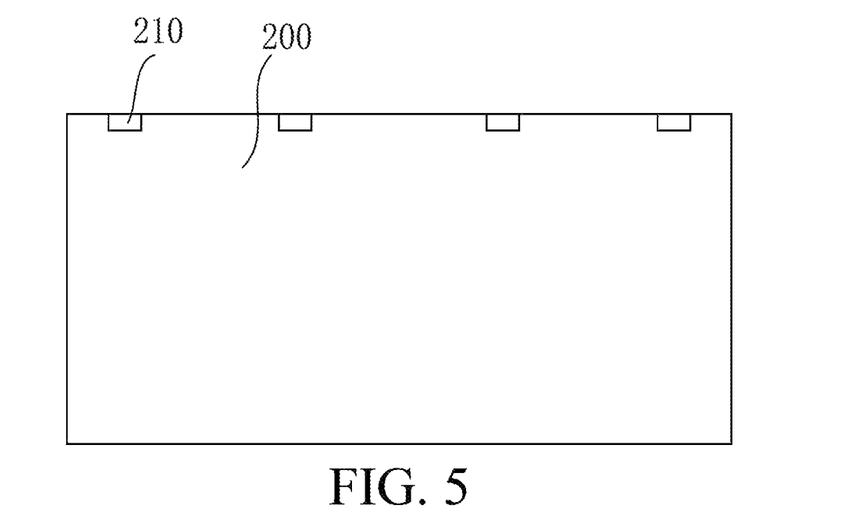
FIG. 5 is a schematic diagram of a display device according to an embodiment of the present disclosure.

In an embodiment, the wall-hanging piece comprises a display device 200. The grooves 210 are disposed at a top portion of the display device 200.

Figure 6:
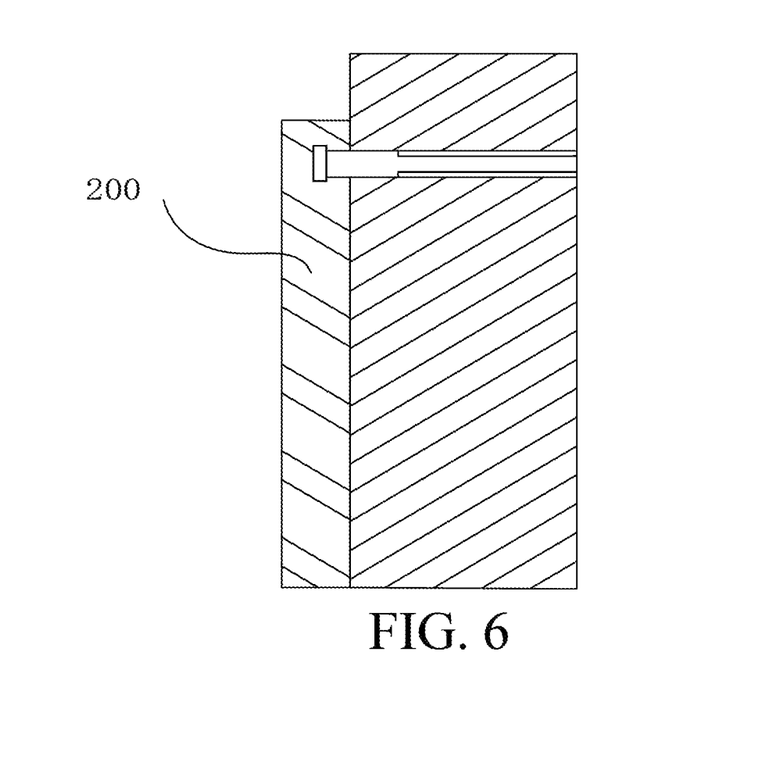
FIG. 6 is a schematic diagram of a cross section of a display device hung on a wall according to an embodiment of the present disclosure.

In this embodiment, the display device 200 is hung on the wall, which greatly improves an appearance effect of the display device 200 and increases an added value of the display device 200. The grooves 210 are disposed at a top portion of the display device 200, the display device 200 is hung on the screws, and the display device 200 is completely attached to the wall by gravity, which is simple and convenient.

In an embodiment, a horizontal length of the mounting jig 100 is greater than a length of the wall-hanging piece.

In this embodiment, a horizontal dimension of the mounting jig 100 is a long strip, and a horizontal length of the mounting jig 100 is greater than a length of the wall-hanging piece, which adapt to a mounting of more large size wall-hanging piece.

In another embodiment of the present disclosure, as shown in FIG. 1 to FIG. 6, the present disclosure further provides a mounting jig 100. The mounting jig is configured to mount a display device 200 on a wall. At least two grooves 210 configured to fix the display device 200 are disposed on the display device 200. The mounting jig 100 comprises at least two hole slots 150. A spacing between the hole slots 150 is equal to a spacing between the grooves 210 corresponding to the hole slots 150. The mounting jig 100 comprises a first substrate 120 and a second substrate 130. A thickness of the first substrate 120 is equal to a depth of the grooves 210 of the wall-hanging piece. A thickness of the second substrate 130 is greater than a thickness of the first substrate 120. The hole slots 150 are semicircular. The hole slot 150 are disposed on an edge of the first substrate 120. A radial size of the hole slots 150 is equal to a radial size of screws configured to hang the display device. An inner side surface of the second substrate 130 is flush with an inner side surface of the first substrate 120. An outer side surface of the second substrate 130 is connected with an outer side surface of the first substrate 120 via a slope.

In this embodiment, there is one-to-one correspondence between the positioning structures 110 disposed on the mounting jig 100 and the grooves 210 disposed on the display devices 200. The mounting jig 100 is configured to assist wall-hanging screws to be mounted in a straight line, ensuring that the display device 200 is aligned, assembled and fixed with the wall-hanging screws accurately. The screws are fixed on the wall, and the display device 200 is hung on heads of screws, thus, the screws need to be not completely attached to the wall. According to a depth that the screws need to stick into the grooves 210 of the display device 200, the thickness of the first substrate 120 is equal to the depth of the grooves 210, ensuring that the reserved exposed size of the screws is equal to the depth required to be stuck into the grooves 210 of the display device 200, thus, the display device 200 is attached to the wall. Since the thickness of the first substrate 120 is equal to a reserved exposed size of the screws, thus, the first substrate 120 is relatively thin. The thickness of the second substrate 130 is greater than the thickness of the first substrate 120, which improves a mechanical strength of the mounting jig 100, and makes the mounting jig 100 being not easily deformed. A diameter of a screw head of the screws is greater than a diameter of a screw column of the screws. When the screws are screwed into the hole slots 150, the hole slots 150 are semicircular and the hole slots 150 are disposed on an edge of the first substrate 120, which facilitate a separation of the mounting jig and the screws. A diameter of the hole slots 150 of the mounting jig 100 is equal to a diameter of the screws configured to hang the display device 200, thus, he screws is positioned within the hole slots 150 in the mounting jig 100 and the accuracy of a mounting of the screws is increased. The thickness of the first substrate 120 is different with the thickness of the second substrate 130, and there is a height difference between the first substrate 120 and the second substrate 130. A strength of a connection portion of the first substrate 120 and the second substrate 130 is improved by the slope. Moreover, the slope is convenient for thumbs to press and support the mounting jig 100 during the mounting process.

Figure 7:
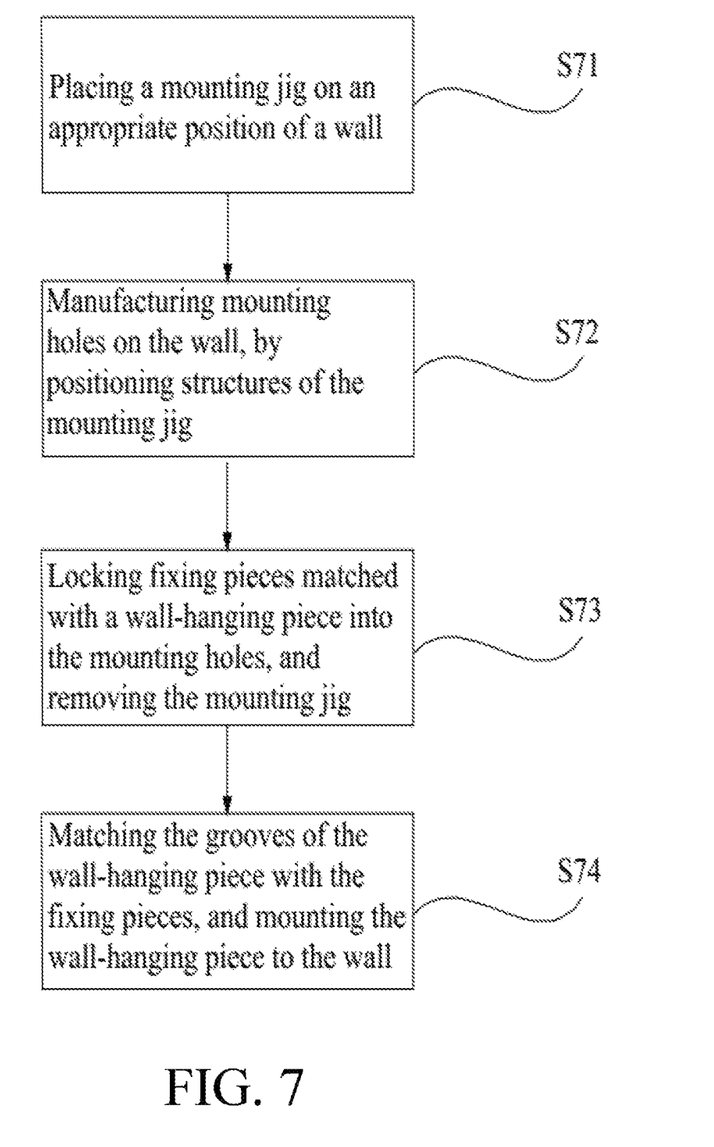
FIG. 7 is a schematic flow diagram of a method of mounting a wall-hanging piece according to an embodiment of the present disclosure.

In another embodiment of the present disclosure, as shown in FIG. 1 to FIG. 7, the present disclosure further provides a mounting, method comprises:

S71: placing a mounting jig on an appropriate position of a wall;

S72: manufacturing mounting holes on the wall, by positioning structures of the mounting jig;

S73: locking fixing pieces matched with a wall-hanging piece into the mounting holes, and removing the mounting jig; and S74: matching the grooves of the wall-hanging piece with the fixing pieces, and mounting the wall-hanging piece to the wall.

In this embodiment, the mounting jig 100 is configured to assist the locking of the screws, ensuring that spacing between the screws accurately position and lock the screws, and ensuring that the screws locked to the wall are aligned assembled and fixed with the grooves of the wall-hanging piece accurately.

Optionally, the step S73 for locking fixing pieces matched with a wall-hanging piece into the mounting holes, and removing the mounting jig comprises: the fixing pieces comprise screws. The positioning structures comprise hole slots 150. The hole slots 150 are semicircular. The hole slots 150 are disposed on an edge of the first substrate 120. The screws are locked into the mounting holes to vertically remove the mounting jig 100.

In an embodiment, the step S71 for placing a mounting jig on an appropriate position of a wall comprises: the mounting jig 100 comprises a level gauge 140 and the level gauge 140 is configured to horizontally place the mounting jig 100 on the wall.

On this embodiment, the level gauge 140 ensures that the mounting holes are in a same horizontal line, and ensures that the wall-hanging piece is mounted horizontally.

In an embodiment, the wall-hanging piece comprises a display device 200. The grooves 210 are disposed at a top portion of the display device 200.

In an embodiment, the display device 200 is attached to a surface of the wall after mounting on the wall.

In this embodiment, the display device 200 is hung on the wall, which greatly improves an appearance effect of the display device 200 and increases an added value of the display device 200. The grooves 210 are disposed at a top portion of the display device 200, the display device 200 is hung on the screws, and the display device 200 is completely attached to the wall by gravity which is simple and convenient.

It should be noted that the limitation of each step involved in the present disclosure is not determined to limit the sequence of steps without affecting the implementation of the specific solution. Steps written in the foregoing can be executed first, or later, or even simultaneously as long as the specific solutions can be implemented, which should be considered as the scope of the present disclosure.

The technical solutions of the present disclosure are widely applied to mount and hang various display panels on the wall. The display panel is selected from a twisted-sematic (TN) type display panel, an optical compensated birefringence (OCB) type display panel, a vertical-alignment (VA) type display panel, and a Multi-domain Vertical Alignment (MVA) display panel. Of course, the display panel can be other types of display panels, such as an organic light-emitting diode (OLED) display panel, which is not limited. And it is also applied to other wall-hanging pieces.

The above content is a further detailed description of the present disclosure in conjunction with the specific optional embodiments, and the specific implementation of the present disclosure is not limited to the description. It will be apparent to those skilled in the art that a number of simple deductions or substitutions may be made without departing from the conception of the present disclosure, which should be considered as being within the scope of the present disclosure.

What is claimed is:

1. A mounting jig configured to mount a wall-hanging piece on a wall, at least two grooves configured to fix the wall-hanging piece are disposed on the wall-hanging piece; the mounting jig comprising at least two positioning structures;

wherein a spacing between the positioning structures is equal to a spacing between the grooves corresponding to the positioning structures;

wherein the mounting jig comprises a first substrate and a second substrate; a thickness of the first substrate is equal to a depth of the grooves of the wall-hanging piece.

2. The mounting jig according to claim 1, wherein the positioning structures are disposed on the first substrate.

3. The mounting jig according to claim 2, wherein a thickness of the second substrate is greater than a thickness of the first substrate.

4. The mounting jig according to claim 3, wherein the positioning structures comprise hole slots; the hole slots are semicircular; the hole slots are disposed on an edge of the first substrate; a radial size of the hole slots is equal to a radial size of the fixing pieces configured to hang the wall-hanging piece.

5. The mounting jig according to claim 2, wherein an inner side surface of the second substrate is flush with an inner side surface of the first substrate; an outer side surface of the second substrate is connected with an outer side surface of the first substrate via a slope.

6. The mounting jig according to claim 5, wherein a surface of the slope is rough.

7. The mounting jig according to claim 1, wherein a level gauge is disposed inside the second substrate.

8. The mounting jig according to claim 1, wherein the wall-hanging piece comprises a display device; the grooves are disposed at a top portion of the display device.

9. The mounting jig according to claim 1, wherein a horizontal length of the mounting jig is greater than a length of the wall-hanging piece.

10. A mounting jig configured to mount a display device on a wall; at least two grooves configured to fix the display device are disposed on the display device; the mounting jig comprising at least two hole slots; a spacing between the hole slots is equal to a spacing between the grooves corresponding to the hole slots;

wherein the mounting jig comprises a first substrate and a second substrate; a thickness of the first substrate is equal to a depth of the grooves of the wall-hanging piece;

wherein a thickness of the second substrate is greater than a thickness of the first substrate;

wherein the hole slots are semicircular; the hole slots are disposed on an edge of the first substrate; a radial size of the hole slots is equal to a radial size of screws configured to hang the display device;

wherein an inner side surface of the second substrate is flush with an inner side surface of the first substrate; an outer side surface of the second substrate is connected with an outer side surface of the first substrate via a slope.

11. A mounting method using a mounting jig configured to mount a wall-hanging piece on a wall, wherein at least two grooves configured to fix the wall-hanging piece are disposed on the wall-hanging piece; the mounting jig comprising at least two positioning structures; wherein a spacing between the positioning structures is equal to a spacing between the grooves corresponding to the positioning structure; wherein the mounting jig comprises a first substrate and a second substrate; a thickness of the first substrate is equal to a depth of the at least two grooves of the wall-hanging piece, the mounting method comprising:
- placing the mounting jig on an appropriate position of the wall;
- manufacturing mounting holes in the wall, by the at least two positioning structures of the mounting jig;
- locking fixing pieces matched with the wall-hanging piece into the mounting holes, and removing the mounting jig; and
- matching the at least two grooves of the wall-hanging piece with the fixing pieces, and mounting the wall-hanging piece to the wall.

12. The mounting method according to claim 11, wherein the step for locking the fixing pieces matched with the wall-hanging piece into the mounting holes, and removing the mounting jig comprises: the fixing pieces comprise screws; the positioning structures comprise hole slots; the hole slots are semicircular; the hole slots are disposed on an edge of the first substrate; the screws are locked into the mounting holes to vertically remove the mounting jig.

13. The mounting method according to claim 11, wherein the step for placing the mounting jig on an appropriate position of the wall comprises: the mounting jig comprises a level gauge; the level gauge is configured to horizontally mount the mounting jig on the wall.

14. The mounting method according to claim 11, wherein the wall-hanging piece comprises a display device; the grooves are disposed at a top portion of the display device.

15. The mounting method according to claim 14, wherein the display device is attached with a surface of the wall after mounting on the wall.

* * * * *